United States Patent [19]

Kolts et al.

[11] Patent Number: 4,808,394

[45] Date of Patent: Feb. 28, 1989

[54] CATALYTIC OXIDATION OF CARBON MONOXIDE

[75] Inventors: John H. Kolts, Bartlesville, Okla.; Simon G. Kukes, Naperville, Ill.

[73] Assignee: Phillips Petroleum Company, Bartlesville, Okla.

[21] Appl. No.: 94,462

[22] Filed: Sep. 8, 1987

[51] Int. Cl.[4] .............................................. C01B 31/20
[52] U.S. Cl. ................................ 423/437; 423/213.5; 423/247; 502/328; 502/330; 502/339
[58] Field of Search .................... 423/213.5, 247, 437, 423/220; 502/362, 328, 330, 339

[56] References Cited

U.S. PATENT DOCUMENTS

| | | | |
|---|---|---|---|
| Re. 31,719 | 10/1984 | Sonetaka et al. | 502/328 |
| 2,330,664 | 9/1943 | Bennett et al. | 423/213.5 |
| 3,042,197 | 7/1962 | Binning et al. | 208/143 |
| 3,170,758 | 2/1965 | Honerkamp | 423/437 |
| 3,794,588 | 2/1974 | Stiles | 252/462 |
| 3,867,309 | 2/1975 | Oleck et al. | 423/213.5 |
| 3,914,377 | 10/1975 | Anderson et al. | 423/247 |
| 3,963,827 | 6/1976 | Acres et al. | 423/239 |
| 4,117,082 | 9/1978 | Matsuyama | 423/247 |
| 4,123,391 | 10/1978 | Noguchi et al. | 252/466 PT |
| 4,239,656 | 12/1980 | Fujitani et al. | 252/462 |
| 4,252,687 | 2/1981 | Dale et al. | 252/455 Z |
| 4,292,288 | 9/1981 | Gladrow | 423/247 |
| 4,320,030 | 3/1962 | Happel et al. | 252/432 |
| 4,344,905 | 8/1982 | Chilcot | 264/111 |
| 4,378,048 | 3/1983 | Madgaukar et al. | 423/247 |
| 4,388,277 | 6/1983 | Wright | 422/211 |
| 4,451,580 | 3/1984 | Butler et al. | 502/335 |
| 4,490,482 | 12/1984 | Mathieu | 502/339 |
| 4,514,689 | 4/1985 | Blumenthal et al. | 330/4.3 |
| 4,524,051 | 6/1985 | Wright et al. | 423/247 |
| 4,541,996 | 9/1985 | Pereira et al. | 423/213.5 |
| 4,608,357 | 8/1986 | Silverman et al. | 423/247 |
| 4,639,432 | 6/1987 | Holt et al. | 502/324 |
| 4,675,308 | 6/1987 | Wan et al. | 423/213.5 |

FOREIGN PATENT DOCUMENTS

| | | | |
|---|---|---|---|
| 1116585 | 6/1968 | United Kingdom | 502/335 |
| 2028571A | 3/1980 | United Kingdom | 502/335 |
| 2083687A | 3/1982 | United Kingdom | 502/335 |

OTHER PUBLICATIONS

"Celcor ® Honeycomb Ceramic Catalyst Supports", Cornining Glass Works.

"The Catalytic Oxidation of CO for Sealed $CO_2$ Laser Applications", by I. M. Miller et al., ACS Fall 1985 Meeting, Chicago, Division of Colloid and Surface Chemistry, paper No. 115.

Primary Examiner—John Doll
Assistant Examiner—Robert M. Kunemund
Attorney, Agent, or Firm—K. K. Brandes

[57] ABSTRACT

A composition of matter comprising alumina and Pt and/or Pd is prepared by a process comprising the steps of impregnating an alumina-containing support material with a solution of a thiocyanate compound (preferably $NH_4SCN$), drying the thus impregnated material, contacting the dried material with a solution of at least one compound of Pt and/or Pd, drying/calcining the Pt and/or Pd impregnated material, and heating it in a reducing gas, preferably free hydrogen, at a temperature of about 550°–700° C. The above composition of matter is used as catalyst in a process for oxidizing CO to $CO_2$, e.g., in a $CO_2$ laser.

38 Claims, 2 Drawing Sheets

CATALYTIC OXIDATION OF CARBON MONOXIDE

BACKGROUND OF THE INVENTION

This invention relates to the oxidation of carbon monoxide to carbon dioxide. In another aspect, this invention relates to the catalytic oxidation of carbon monoxide, in particular under conditions suitable for laser applications. In a further aspect, this invention relates to effective CO oxidation catalyst compositions. In still another aspect, this invention relates to a process for preparing CO oxidation catalyst compositions.

The use of catalysts for the oxidation of carbon monoxide to carbon dioxide by reaction with oxygen, in particular at low temperature, is of much interest, e.g., in breathing masks designed to remove CO from inhaled air, and in $CO_2$ lasers for combining CO and $O_2$ formed by dissociation of $CO_2$ during discharge. In the latter application, the presence of $O_2$ is most undesirable because it can cause a breakdown of the electrical field in the laser cavity. Several patents, such as U.S. Pat. Nos. 4,490,482 and 4,639,432 disclose compositions useful as CO oxidation catalysts in $CO_2$ laser applications. However, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is another object to provide a process for preparing a composition of matter which is effective as a catalyst for the oxidation of carbon monoxide. It is a further object of this invention to provide an effective process for catalytically oxidizing carbon monoxide. Other objects and advantages will be apparent from the detailed description and the claims.

In accordance with this invention, a process for preparing a composition of matter (from which silica and tin compounds, in particular tin oxides such as $SnO_2$ are substantially absent; and which is suitable and effective as a catalyst composition for the oxidation of carbon monoxide by reaction with free oxygen) comprises the steps of:

(a) impregnating a support material (from which silica and tin compounds, in particular $SnO_2$, are substantially absent) comprising (preferably consisting essentially of) alumina
with a solution (from which tin compounds are substantially absent) comprising (preferably consisting essentially of) water and at least one dissolved thiocyanate compound (preferably alkali metal thiocyanate and/or alkaline earth metal thiocyanate and/or ammonium thiocyanate, more preferably $NH_4SCN$);

(b) heating the material obtained in step (a) under such conditions as to at least partially (preferably substantially) dry said material obtained in step (a);

(c) contacting (preferably impregnating) the substantially dried material obtained in step (b) with a solution (from which tin compounds are substantially absent) comprising at least one dissolved compound of at least one noble metal selected from the group consisting of platinum and palladium (preferably Pt);

(d) heating the material obtained in step (c) under such conditions as to substantially dry said material obtained in step (c) and to at least partially (preferably substantially) convert said at least one compound of Pt and/or Pd to at least one of oxides of Pt, oxides of Pd, Pt metal and Pd metal; and (e) heating the material obtained in step (d) in a reducing gas atmosphere, preferably a free hydrogen containing gas, more preferably a stream of $H_2$, at a temperature in the range of from about 550° to about 700° C., under such conditions as to activate said material obtained in step (d), i.e., to make the material obtained in step (d) active as a catalyst for CO oxidation by reaction with $O_2$.

In a preferred embodiment, heating step (d) is carried out in two sub-steps;

(d1) heating the material obtained in step (c) at a first temperature so as to remove substantially all liquids [i.e., the solvent of the solution used in step (c)] from said material obtained in step (c), and (d2) heating (calcining) the substantially dried material obtained in step (d1) at a second temperature, which is higher than said first temperature, so as to at least partially (preferably substantially) convert said at least one compound of Pt and/or Pd to at least one of oxides of Pt, oxides of Pd, metallic Pt and metallic Pd (i.e., Pt oxide and/or Pd oxide and/or Pt metal and/or Pd metal).

In another preferred embodiment, the solution used in step (c) additionally comprises at least one dissolved compound of iron, which is at least partially (preferably substantially) converted to iron oxide in step (d) or, alternatively, step (d2). In another preferred embodiment, compounds of Co and of Mn are substantially absent (besides silica and Sn compounds) from the material obtained in step (e).

Also in accordance with this invention, there is provided a composition of matter (useful and effective as a catalyst composition for the oxidation of CO with $O_2$), from which silica and tin compounds (in particular tin oxides) are substantially absent, comprising (i) a support material comprising (preferably consisting essentially of) alumina, and (ii) at least one noble metal selected from the group consisting of Pt and Pd; said composition of matter having been prepared by the process described above comprising steps (a) (b), (c), (d) and (e) or, alternatively, steps (a), (b), (c), (d1), (d2) and (e). Preferably said composition of matter further comprises (iii) iron oxide. In a more preferred embodiment, the composition of matter consists essentially of components (i), (ii) and (iii).

Further in accordance with this invention, a process for oxidizing carbon monoxide comprises contacting a gas mixture comprising CO and $O_2$ with a catalyst composition (from which silica and tin compounds are substantially absent) comprising alumina and at least one of Pt and Pd; said catalyst composition having been prepared by a process comprising steps (a), (b), (c), (d) and (e) or, alternatively, (a), (b), (c), (d1), (d2) and (e), as defined above, under such conditions as to at least partially (preferably substantially) convert CO and $O_2$ to $CO_2$.

Preferably, in the CO oxidation in process of this invention the catalyst composition of this invention (described above) additionally comprises iron oxide (e.g., FeO and/or $FE_2O_3$ and/or $Fe_3O_4$). Also preferably, compounds of Co and Mn are substantially absent from the catalyst composition. In a preferred embodiment, the CO oxidation process of this invention is carried out at a temperature of about 0°–100°C.

DETAILED DESCRIPTION OF THE INVENTION

Figure 1:
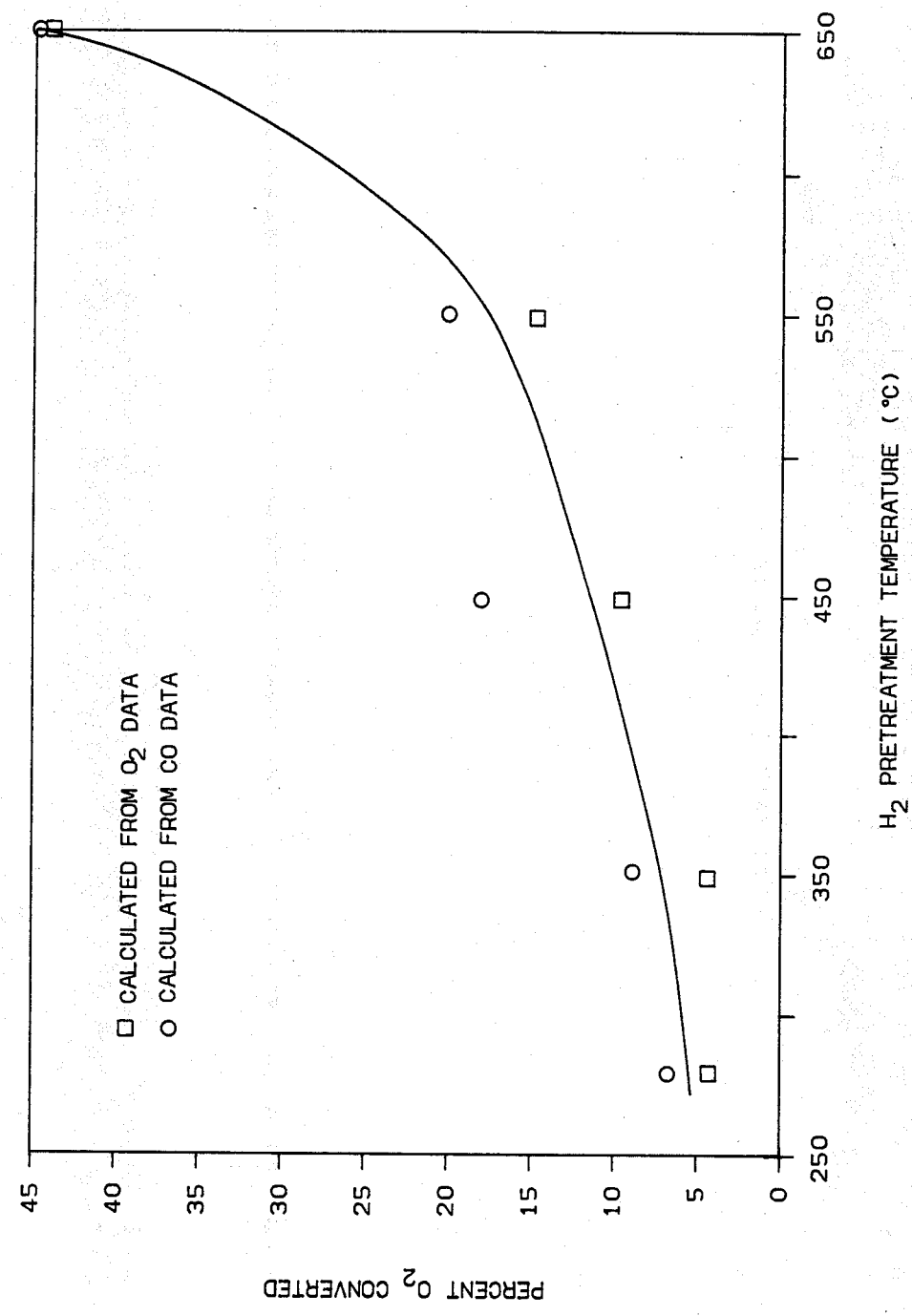
FIG. 1 shows the dependence of $O_2$ conversion (and thus CO conversion) during low temperature oxidation of CO upon the temperature during reducing pretreatment of a $Pt/Al_2O_3$ catalyst in $H_2$.

Any alumina containing support material can be used as the support material. Substantially pure alumina (containing at least about 95 weight-% $Al_2O_3$) is presently preferred. The method of preparation of alumina is not considered critical. Alumina containing support materials are commercially available. Generally, first a hydroxide and/or hydrated oxide of alumina is precipitated from an aqueous solution of a dissolved aluminum compounds by means of a suitable alkaline substance (e.g., are aqueous $NH_3$). Then the precipitate is separated, washed, and finally heated so as to remove water therefrom and to convert the hydroxide of aluminum to aluminum oxide. A mixture of alumina and magnesia can also be used, at any suitable weight percentage of each (such as about 60–99.9 weight-% $Al_2O_3$ and about 40–0.1 weight-% MgO).

Generally the surface area (determined by the $BET/N_2$ method; ASTM D3037) of alumina is in the range of from about 10 to about 350 $m^2/g$, preferably from about 100 to about 300 $m^2/g$. The alumina support material can have spherical, trilobal, quadrilobal or irregular shape. When alumina spheres are used, the diameter generally is in the range of from about 0.2 to about 20 mm, preferably about 0.5–3 mm. Silica and tin compounds should be substantially absent from the support material (i.e., silica and tin compounds, in particular tin oxides, more particularly tin dioxide, should not be present at a level higher than about 0.5 preferably about 0.2, weight-% each).

It is within the scope of this invention to prepare suitable support materials by coating a honeycomb ceramic material, such as a monolith (commercially available from Corning Glass Works, Corning, NY; described in U.S. Pat. Nos. 4,388,277 and 4,524,051) with alumina. The monolith can be impregnated with an organic compound of Al (such has trialkyl Al), hydrolyzed, dried and calcined. Or the monolith can be impregnated with a dispersion (preferably colloidal) of oxides/hydroxides of Al, followed by drying and calcining.

Any suitable thiocyanate compounds can be used as solute in the solution employed in step (a). Non-limiting examples of such thiocyanates are $NH_4SCN$, LiSCN, NaSCN, KSCN, CsSCN, RbSCN, $Mg(SCN)_2$, $Ca(SCN)_2$, and other alkaline earth metal thiocyanates, preferably $NH_4SCN$. It is understood that these thiocyanates can be applied as hydrates. It is also understood that the ammonium group in ammonium thiocyanate can be alkyl-substituted (presently not preferred).

The construction of the thiocyanate compound in the aqueous impregnating solution used in steps (a) generally is in the range of from about 1 to about 200 grams per liter (g/l) solution, preferably from about 10 to about 100 g/l, more preferably from about 30 to about 80 g/l. The weight ratio of the alumina-containing support material to the thiocyanate-containing impregnating solution employed in step (a) generally is in the range of from about 1:20 to about 5:1 (depending on the concentration of the thiocyanate-containing solution), preferably from about 1:5 to about 1:1. The impregnation time in step (a) should be long enough to ensure that the alumina-containing support material is substantially penetrated by the impregnating solution. Generally, the impregnation time is in the range of from about 1 to about 500 minutes, preferably from about 10 to about 100 minutes. The temperature during impregnation in step a can be ambient (e.g. about 60°–75° F.) or higher (e.g., about 80°–200° F.).

Heating step (b) is generally carried out in an oxidizing gas atmosphere (preferably in air) or an inert gas atmosphere, at a temperature ranging from about 40° C. to about 200° C., so as to remove the greatest portion of water from the mixture obtained in the preceding step. Vacuum conditions may be employed but are presently not preferred. The substantially dried material obtained in step (b) generally contains less than about 20 weight-% water. Depending on the heating temperature and specific heating conditions (such as extent of gas movement and thickness of the solid layer to be dried), the heating time ranges generally from about 0.5 hour to about 100 hours, preferably from about 1 hour to about 20 hours.

The impregnation in step (c) of the material obtained in step (b) with Pt and/or Pd (preferably Pt) can be carried out in any suitable manner. First, compounds of Pt and/or Pd are dissolved in a suitable solvent (preferably water) so as to prepare solutions of suitable concentration, generally containing from about 0.005 to about 0.20, preferably about 0.01 to about 0.1, g Pt and/or Pd per cc of solution. Non-limiting examples of suitable compounds of Pt and Pd are: $PtCl_2$, $PtCl_4$, $H_2PtCl_6$, $PtBr_4$, $Pt(NH_3)_4Cl_2$, $Pt(NH_3)_4(NO_3)_2$ and the like; $PdCl_2$, $PdCl_4$, $H_2PdCl_6$, $Pd(NH_3)_4(NO_3)_2$ and the like; preferably (at present) $H_2PtCl_6$ and $Pd(NH_3)_4(NO_3)_2$. The support material is then impregnated by soaking it in the solution of Pt and/or Pd compounds; or (less preferably) the Pt and/or Pd containing solution is sprayed onto the support material. The ratio of Pt and/or Pd solution to support material generally is such that the final catalyst contains about 0.5 to about 5, preferably about 1 to about 3, weight-% Pt or Pd. When a solution containing both Pt and Pd compounds, the level of Pt and Pd generally is about 0.5 to about 5, preferably about 1 to about 3, weight percent (Pt+Pd).

In a preferred embodiment, a compound of iron is also present in the impregnating solution of step (c) (besides Pt and/or Pd). Non-limiting examples of suitable Fe compounds that can be used as solutes are $FeCl_2$, $FeCl_3$, $Fe_2(SO_4)_3$, $Fe(NO_3)_2$, $Fe(NO_3)_3$ and the like, preferably compounds of Fe in the valence state +3, more preferably $Fe(NO_3)_3$. Generally, the concentration of Fe (expressed as Fe metal) is in the range of from about 0.01 to about 0.4, preferably about 0.02 to about 0.2, g Fe per cc solution. The impregnation of the support material with Pt and/or Pd and Fe can be carried out either by sequential impregnation (first Pt and/or Pd, then Fe) or by simultaneous impregnation in step (a) (using a solution containing Pt and/or Pd compounds and at least one Fe compound).

When sequential impregnation is employed, the impregnation with a solution of at least one Fe compound is carried out after heating step (d) and before step (e).

Thus, after step (d) or, alternatively, after step (d2), an impregnating step (c*) with at least one Fe compound and a subsequent heating step (d*) [carried out in substantially the same manner as step (d)] are performed before step (e). The ratio of Fe containing solution to support material is such as to provide a level of about 0.2 to about 4, preferably about 0.5–2, weight percent Fe.

Compounds of tin are to be substantially absent in the impregnating solutions used in impregnation steps (c) and (C*); and preferably compounds of cobalt and of manganese should also be substantially absent from these solutions since these compounds have a detrimental effect on the activity for CO oxidation of the finished catalyst.

Heating step (d) is generally carried out in an inert or oxidizing atmosphere, preferably a free oxygen containing gas atmosphere (such as air), generally at a temperature ranging from about 30 to about 700° C. Preferably heating step (d) is carried out in two sequential sub-steps: sub-step (d1), at about 30 to about 200° C. (preferably at about 80°–130° C.), generally for about 0.5 to about 10 hours, so as to substantially dry the impregnated material obtained in step (c) (preferably under such conditions as to reduce the level of adhered and occluded water to less than about 20 weight-%); and sub-step (d2), at about 300° to about 700° C. (preferably about 400° to about 600° C.), generally for about 1 to about 20 hours, under such conditions as to substantially calcine the impregnated support material so as to obtain oxides of Pt and/or Pd, optionally mixed with metallic Pt and/or Pd, on alumina and/or magnesia. When a Fe compound has been present in any of the impregnating solutions, at least one oxide of Fe is formed in heating steps (d) or (d2) or (d*).

Reducing step (e) can be carried out in any suitable manner at a temperature in the range of from about 550° to about 700° C., preferably from about 600° to about 660° C. Any reducing gas can be employed, such as a gas comprising $H_2$, CO, gaseous hydrocarbons such as methane, mixtures of the above, and the like. Preferably, a free hydrogen containing gas, more preferaby a hydrogen gas stream, most preferably substantially pure $H_2$, is employed. Reducing step (e) can be carried out for any suitable period of time suitable to activate the calcined material obtained in step (d), or alternatively step (d2) or, if applicable, step (d*), preferably from about 0.5 to about 20 hours.

The composition of matter of this invention obtained in step (e) generally has a surface area (determined by the BET/$N_2$ method; ASTM D3037) of the calcined catalyst compositions of matter of this invention generally is in the range of from about 10 to about 350 m$^2$/g, preferably in the range of from about 100 to about 300 m$^2$/g. The pore volume (determined by mercury intrusion using an Autopore 9200 instrument of Micromeretics, Norcross, Ga.) generally is in the range of from about 0.2 to about 2.0 cc/g. The compositions of matter of this invention can be spherical (preferred) or can be compacted into various shapes (e.g., cylindrical, trilobal, etc.) for convenient shipping and for use in fixed catalyst beds.

The process for oxidizing a carbon monoxide containing feed gas can be carried at any suitable temperature and pressure conditions, for any suitable length of time, at any suitable gas hourly space velocity, and any suitable volume ratio of CO and $O_2$. The reaction temperature generally is in the range of from about 0° to about 400° C., preferably from about 0° to about 100° C., more preferably from about 10° to about 50° C., most preferably about 20°–40° C. The pressure during the oxidation process generally is in the range of from about 1 to about 2,000 psia, preferably from about 5 to about 20 psia. The volume ratio of CO to $O_2$ in the feed gas can be in the range of from about 1:100 to about 100:1, preferably in the range of from about 1:10 to about 10:1. The volume percentage of CO and the volume percentage of $O_2$ in the feed gas can each be in the range of from about 0.05 to about 50, preferably from about 0.05 to about 3. The gas hourly space velocity (cc feed gas per cc catalyst per hour) can be in the range of from about 0.5 to about 10,000, preferably from about 1 to about 1,000. It is understood that the calculation of the gas hourly space velocity is based on the volume of the active catalyst i.e., the alumina supported Pt and/or Pd catalyst (optionally also containing iron oxide) excluding the volume occupied by any additional support material, such as a monolith, which may be present.

The feed gas can be formed in any suitable manner, e.g., by mixing CO, $O_2$ and, optionally, other gases such as $CO_2$, $N_2$, He and the like, such as in a carbon dioxide laser cavity. Or the feed gas can be an exhaust gas from a combustion engine, or it can be air that is to be inhaled by humans and contains undesirable levels of toxic carbon monoxide, and the like. The feed gas can be contacted in any suitable vessel or apparatus, such as in a laser cavity or in an exhaust pipe of a combustion engine, or in a gas mask used by humans, wherein the feed gas passes over the catalyst composition of this invention at the conditions described above. The CO oxidation process of this invention can be carried out in any suitable setting and for any purpose, e.g., to recombine CO and $O_2$ in $CO_2$ lasers, to oxidize CO contained in exhaust gases or in air, to make isotopically labeled $CO_2$ from CO and the $^{18}_8O$ isotope, and the like.

The following examples are presented in further illustration of the invention and are not to be construed as unduly limiting the scope of the invention.

EXAMPLE I

This example illustrates the experimental setup for testing the activity of supported noble metal catalysts for catalyzing the oxidation of carbon monoxide at low temperatures (to simulate catalytic recombination of CO and $O_2$ in $CO_2$ lasers). A gaseous feed blend comprising CO, $O_2$, He and $N_2$ was passed through a flow meter, a needle valve and a glass reactor tube in an upflow direction. The gas reactor tube had an inner diameter of about 1.5 cm and generally contained a bed of about 20 cc (10 g) catalyst to be treated. The temperature in the catalyst bed was measured by means of a thermocouple inserted into the top of the catalyst bed. The contents of $O_2$ and CO in the gaseous effluent from the reactor were measured by means of a Hewlett-Packard 5890 gas chromatograph using Porapak Q and molecular sieve columns, and CO and $O_2$ conversions were determined.

All tests were carried out at ambient conditions. Generally the temperature in the catalyst bed rose to about 30° C. because of the generation of heat during the CO oxidation tests. The feed rate of the gaseous feed stream was about 10–120 cc/minute.

EXAMPLE II

This example illustrates the preparation of various alumina-supported, Fe/Pt-promoted catalyst materials.

Invention Catalyst A was prepared as follows: 30.5 grams of ⅛ inch spheres of alumina having a BET/$N_2$ surface area of about 225 $m^2$/g, provided by Aluminum Company of America (Alcoa), Pittsburgh, PA were soaked, with stirring, for about an hour with a solution of 5.0 g $NH_4SCN$ in 100 cc of deionized water. The thus soaked material was dried under a heat lamp for about 5 hours. 10 grams of the dried alumina material was then impregnated with 9.3 cc of an aqueous chloroplatinic acid solution (containing 0.022 g Pt/cc), dried at 150° C., impregnated with 10 cc of an aqueous iron(III) nitrate solution (containing 0.01 g Fe/cc), dried at 150° C., and calcined in air at 300° C. for about 3 hours. Catalyst A was heated (pretreated) in a hydrogen gas stream for 3 hours at 500° C. and thereafter heated at that temperature in helium for 0.5 hours. Catalyst A contained 1 weight-% Fe and 2 weight-% Pt on $NH_4SCN$ pretreated alumina support.

Control Catalyst B was prepared in accordance with the procedure described for Catalyst A, except that 5.0 g $(NH_4)_2SO_4$ was used in lieu of $NH_4SCN$. Catalyst B contained 1 weight-% Fe and 2 weight-% Pt on $(NH_4)_2SO_4$-pretreated alumina support.

Control Catalyst C was prepared in accordance with the procedure for Catalyst A, except that 5.0 g $NH_4OH$ was used in lieu of $NH_4SCN$. Catalyst C contained 1 weight-% Fe and 2 weight-% Pt on $NH_4OH$-pretreated alumina support.

Control Catalyst D was prepared in accordance with the procedure for Catalyst A, except that alumina was not pretreated with any ammonium compound. Catalyst D also contained 1 weight-% Fe and 2 weight-% Pt (supported by untreated alumina).

EXAMPLE III

This example illustrates the use of the catalysts of Example II for low temperature oxidation of CO, in accordance with the procedure described in Example I. The gaseous feed blend contained 1.2 volume-% CO, 0.6 volume-% $O_2$, 48.6 volume-% $N_2$ and 49.7 volume-% He. Test results are summarized in Table I.

TABLE I

| Catalyst | Gas Feed Rate (cc/min.) | Minutes on Stream | % of CO Converted | cc/min. CO Converted |
|---|---|---|---|---|
| A (Invention) | 40 | 4 | 100 | 0.47 |
|  |  | 10 | 100 | 0.47 |
|  |  | 14 | 100 | 0.47 |
|  |  | 20 | 100 | 0.47 |
| A (Invention) | 120 | 24 | 50 | 0.70 |
|  |  | 30 | 46 | 0.65 |
|  |  | 35 | 41 | 0.58 |
|  |  | 40 | 39 | 0.55 |
|  |  | 45 | 37 | 0.52 |
|  |  | 50 | 34 | 0.48 |
|  |  | 60 | 31 | 0.43 |
|  |  | 70 | 31 | 0.43 |
|  |  | 80 | 31 | 0.43 |
|  |  | 90 | 31 | 0.43 |
|  |  | 100 | 28 | 0.40 |
| B (Control) | 10 | 2 | 22 | 0.03 |
|  |  | 6 | 23 | 0.03 |
|  |  | 10 | 22 | 0.03 |
|  |  | 14 | 20 | 0.02 |
| C (Control) | 40 | 2 | 21 | 0.10 |
|  |  | 4 | 16 | 0.08 |
|  |  | 6 | 13 | 0.06 |
|  |  | 8 | 9 | 0.04 |
| D (Control) | 40 | 2 | 42 | 0.20 |
|  |  | 4 | 34 | 0.16 |
|  |  | 6 | 29 | 0.14 |
|  |  | 10 | 24 | 0.11 |
|  |  | 14 | 22 | 0.10 |

Test data in Table I shows that invention Catalyst A (Fe/Pt on $NH_4SCN$-pretreated alumina) was considerably more active than control Catalsyt D (Fe/Pt on untreated alumina) and control Catalysts B and C (Fe/Pt on alumina that had been pretreated with $(NH_4)_2SO_4$ and $NH_4OH$, respectively). This result is most surprising, especially in view of the fact that pretreatment of alumina with $(NH_4)_2SO_4$ and $NH_4OH$ actually had a detrimental effect on the CO oxidation activity of the $Fe/Pt/Al_2O_3$ base Catalyst (compare CO conversion for Catalysts B and C vs. Catalyst D).

EXAMPLE III

This example illustrates the effect of the $H_2$-pretreated temperature on the CO oxidation activity of alumina-supported Pt catalysts. Catalyst materials with 2 weight-% Pt on untreated alumina (without Fe) were pretreated with $H_2$ at different temperatures before they were tested in the CO oxidation unit, substantially in accordance with the test procedures described in Examples I and II. Test results are shown in FIG. 1.

Based on these test results, it is concluded that a catalyst comprising Pt (preferably containing 1-2 weight-% Pt and, optionally, 1-2 weight-% Fe) on $NH_4SCN$-pretreated $Al_2O_3$ support will also be more active as a CO oxidation catalyst if it has been pretreated in $H_2$ at a temperature above 550° C. (e.g., about 500°-700° C.).

Additional tests have shown that a Pd catalyst on untreated $Al_2O_3$ support was also active for catalyzing CO oxidation at low temperatures. Based on these test results, it is concluded that $H_2$-pretreated catalysts comprising Pd (preferably about 1-2 weight-% Pd) and $NH_4SCN$-pretreated alumina support will also be more active for CO oxidation than catalysts comprising Pd and untreated alumina (or alumina that has been pretreated with $(NH_4)_2SO_4$ or $NH_4OH$).

Figure 2:
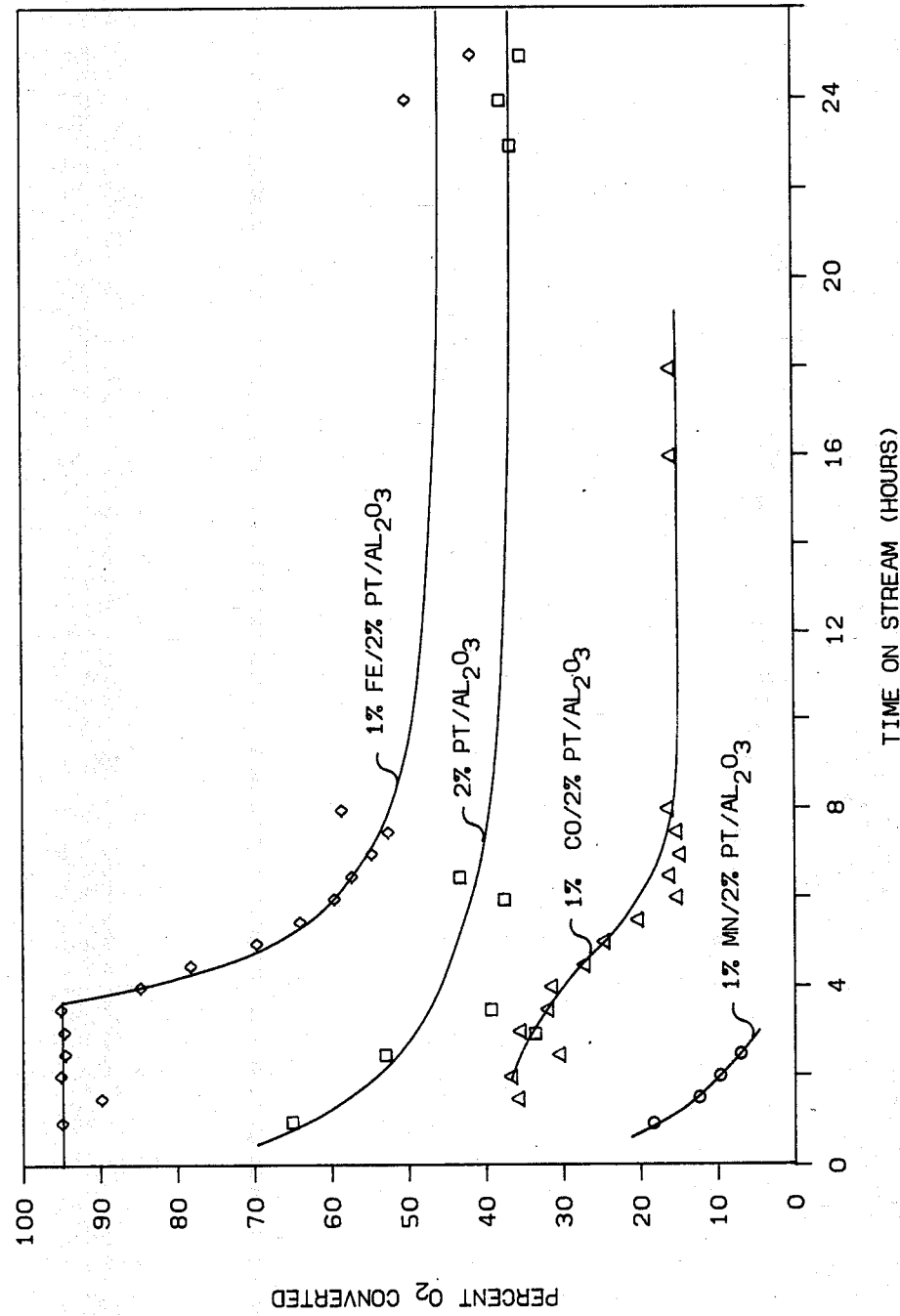
FIG. 2 illustrates the effect of copromoters on the catalytic activity of a $Pt/Al_2O_3$ catalyst when used for low temperature oxidation of CO.

Results of another test series (see FIG. 2) have shown that the addition of Co and Mn to a $Pt/Al_2O_3$ catalyst was detrimental to the CO oxidation activity of this catalyst, whereas the addition of Fe improved the CO oxidation activity of a $Pt/Al_2O_3$ catalyst. In a separate test series, 5 weight-% tin as $SnO_2$ had been added to a catalyst containing 1 weight-% Pt on $Al_2O_3$. The $O_2$ conversion of this tin oxide containing catalyst (pretreated in $H_2$ at 660° C.) ranged from about 19% after 0.5 hours on stream to about 5% after 2 hours on stream, whereas the $O_2$ conversion attained with a 1% Pt $Al_2O_3$ catalyst without Sn at the same conditions was essentially 100%. Based on the above results, it is concluded that Sn and compounds thereof and, preferably, also Co and Mn and compounds thereof should be substantially absent from the catalyst of this invention comprising Pt or (less preferably) Pd and $NH_4SCN$-pretreated alumina support, while it is preferred to have Fe or compounds thereof present in the catalyst composition of this invention.

In a further test, a catalyst containing 1 weight-% Pt on $SiO_2$ (as support) was pretreated in $H_2$ at 660° C. for 1 hour and was then employed as ctalyst for oxidizing CO at room temperature in accordance with the above described procedure. This silica-supported Pt catalyst showed no activity for catalyzing the oxidation of CO. It is thus concluded that silica should be substantially absent from the catalyst from this invention.

Reasonable variations, modifications and adaptions for various usages and conditions can be made within the scope of the disclosure and the appended claims, without departing from the scope of this invention.

That which is claimed is:

1. A process for oxidizing carbon monoxide comprising the step of
   contacting a gas mixture comprising CO and $O_2$ with
   a catalyst composition consisting essentially of alumina that has been treated with ammonium thiocyanate and at least one noble metal selected from the group consisting of platinum and palladium,
   under such reaction conditions as to at least partially convert said CO and $O_2$ to $CO_2$;
   wherein said catalyst composition has been prepared by a preparation process comprising the steps of
   (a) impregnating a support material comprising alumina
   with a solution comprising water and dissolved ammonium thiocyanate;
   (b) heating the material obtained in step (a) under such conditions as to at least partially dry said material obtained in step (a);
   (c) contacting the substantially dried material obtained in step (b) with a solution comprising at least one dissolved compound of at least one noble metal selected from the group consisting of platinum and palladium;
   (d) heating the material obtained in step (c) under such conditions as to substantially dry said material obtained in step (c) and to at least partially cover said at least one compound of at least one noble metal to at least one of oxides of Pt, oxides of Pd, Pt metal and Pd metal; and
   (e) heating the material obtained in step (d) in a reducing gas atmosphere at a temperature in the range of from about 550° to about 700° C., under such conditions as to activate said material obtained in step (d) and to form said catalyst composition.

2. A process in accordance with claim 1, wherein said reducing gas atmosphere is a free hydrogen containing gas.

3. A process in accordance with claim 1, wherein step (e) is carried out in a stream of $H_2$ at a temperature in the range of from about 600° to about 660° C., for a period of time in the range of from about 0.5 to about 20 hours.

4. A process in accordance with claim 1, wherein impregnating step (a) is carried out for about 1-500 minutes, the impregnating solution of step (a) comprises about $1 \geqq 200$ g $NH_4SCN$ per liter, and the weight ratio of the support material to said impregnating solution is in the range of from about 1:20 to about 5:1.

5. A process in accordance with claim 4, wherein impregnating step (a) is carried out for about 10-100 minutes, said impregnating solution comprises about 10-100 g $NH_4SCN$ per liter and said weight ratio is in the range of about 1:5 to about 1:1.

6. A process in accordance with claim 1 wherein said catalyst composition comprises from about 0.5 to about 5 weight percent of said noble metal.

7. A process in accordance with claim 1, wherein said noble metal is platinum.

8. A process in accordance with claim 1, wherein step (d) is carried out in two sub-steps:

(d1) heating the material obtained in step (c) at a first temperature so as to remove substantially all liquids from said material obtained in step (c), and (d2) heating the substantially dried material obtained in step (d1) at a second temperature, which is higher than said first temperature, so as to at least partially convert said at least on compound of at least one noble metal to at least one of oxides of Pt, oxides of Pd, metallic Pt and metallic Pd.

9. A process in accordance with claim 8, wherein said first temperature is in the range of from about 30° to about 200° C., said second temperature is in the range of from about 300° to about 700° C., and heating step (b) is carried out at a temperature in the range of from about 40° to about 200° C.

10. A process for oxidizing carbon monoxide comprising the step of
    contacting a gas mixture comprising CO and $O_2$ with
    a catalyst composition consisting essentially of alumina that has been treated with ammonium thiocyanate, iron oxide and at least one noble metal selected from the group consisting of platinum and palladium,
    under such reaction conditions as to at least partially convert said CO and $O_2$ to $CO_2$;
    wherein said catalyst composition has been prepared by a preparation process comprising the steps of
    (a) impregnating a support material comprising alumina with a solution comprising water and dissolved ammonium thiocyanate;
    (b) heating the material obtained in step (a) under such conditions as to at least partially dry said material obtained in step (a);
    (c) contacting the substantially dried material obtained in step (b) with a solution comprising at least one iron compound and at least one dissolved compound of at least one noble metal selected from the group consisting of platinum and palladium;
    (d) heating the material obtained in step (c) under such conditions as to substantially dry said material obtained in step (c), and to at least partially convert said at least one iron compound to iron oxide and said at least one compound of at least one noble metal to at least one of oxides of Pt, oxides of Pd, Pt metal and Pd metal; and
    (e) heating the material obtained in step (d) in a reducing gas atmosphere at a temperature in the range of from about 550° to about 700° C., under such conditions as to activate said material obtained in step (d) and to form said catalyst composition.

11. A process in accordance with claim 10, wherein said process is carried out in the cavity of a $CO_2$ laser so as to recombine CO and $O_2$ formed by dissociation of $CO_2$.

12. A process in accordance with claim 10, wherein said catalyst composition contains about 0.5 to about 5 weight percent of said noble metal and about 0.2 to about 4 weight percent Fe.

13. A process in accordance with claim 12, wherein said catalyst composition contains about 0.5 to about 5 weight percent of said noble metal and about 0.2 to about 4 weight percent Fe.

14. A process for oxidizing carbon monoxide comprising the step of
    contacting a gas mixture comprising CO and $O_2$ with
    a catalyst composition consisting essentially of alumina that has been treated with ammonium thiocyanate, iron oxide and at least one noble metal selected from the group consisting of platinum and palladium, under such reaction conditions as to at least partially convert said CO and $O_2$ to $CO_2$;

wherein said catalyst composition has been prepared by a preparation process comprising the steps of (a) impregnating a support material comprising alumina with a solution comprising water and dissolved ammonium thiocyanate;

(b) heating the material obtained in step (a) under such conditions as to at least partially dry said material obtained in step (a);

(c) contacting the substantially dried material obtained in step (b) with a solution comprising at least one dissolved compound of at least one noble metal selected from the group consisting of platinum and palladium;

(d) heating the material obtained in step (c) under such conditions as to substantially dry said material obtained in step (c) and to at least partially convert said at least one compound of at least one noble metal to at least one of oxides of Pt, oxides of Pd, Pt metal and Pd metal;

(c*) impregnating the material obtained in step (d) with a solution comprising at least one iron compound; and (d*) heating the material obtained in step (c*) under such conditions as to substantially dry said material obtained in step (c*) and to at least partially convert said at least one iron compound to iron oxide; and (e) heating the material obtained in step (d*) in a reducing gas atmosphere at a temperature in the range of from about 550° to about 700° C., under such conditions as to activate said material obtained in step (d) and to form said catalyst composition.

15. A process in accordance with claim 14, wherein said process is carried out in the cavity of a $CO_2$ laser so as to recombine CO and $O_2$ formed by dissociation of $CO_2$.

16. A process in accordance with claim 1, wherein said reaction conditions comprise a reaction temperature in the range of from about 0° C. to about 400° C., a reaction pressure in the range of from about 1 to about 2,000 psia, and a volume ratio of CO to $O_2$ in the range of from about 1:100 to about 100:1.

17. A process in accordance with claim 1, wherein said reaction conditions comprise a temperature in the range of from about 0° C. to 100° C., a reaction pressure in the range of from about 5 to about 20 psia, and a volume ratio of CO to $O_2$ in the range of from about 1:10 to about 10:1.

18. A process in accordance with claim 1 wherein said process is carried out in the cavity of a $CO_2$ laser so as to recombine CO and $O_2$ formed by dissociation of $CO_2$.

19. A process in accordance with claim 10, wherein said reducing gas atmosphere is a free hydrogen containing gas.

20. A process in accordance with claim 10, wherein step (e) is carried out in a stream of $H_2$ at a temperature in the range of from about 600 to about 660° C., for a period of time in the range of from about 0.5 to about 20 hours.

21. A process in accordance with claim 14, wherein said reducing gas atmosphere is a free hydrogen containing gas.

22. A process in accordance with claim 14, wherein step (e) is carried out in a stream of $H_2$ at a temperature in the range of from about 600° to about 660° C., for a period of time in the range of from about 0.5 to about 20 hours.

23. A process in accordance with claim 10, wherein impregnating step (a) is carried out for about 1–500 minutes, the impregnating solution of step (a) comprised about 1–200 g $NH_4SCN$ per liter, and the weight ratio of the support material to said impregnating solution is in the range of from about 1:20 to about 5:1.

24. A process in accordance with claim 10, wherein step (d) is carried out in two sub-steps:

(d1) heating the material obtained in step (c) at a first temperature so as to remove substantially all liquids from said material obtained in step (c) and (d2) heating the substantially dried material obtained in step (d1) at a second temperature, which is higher than said first temperature, so as to at least partially convert said at least one iron compound to iron oxide and said at least one compound of at least one noble metal to at least one of oxides of Pt, oxides of Pd, metallic Pt and metallic Pd;

and wherein step (e) is carried out with the material obtained in step (d2).

25. A process in accordance with claim 14 wherein step (d) is carried out in two sub-steps:

(d1) heating the material obtained in step (c) at a first temperature so as to remove substantially all liquids from said material obtained in step (c), and (d2) heating the substantially dried material obtained in step (d1) at a second temperature, which is higher than said first temperature, so as to at least partially convert said at least one compound of at least one noble metal to at least one of oxides of Pt, oxides of Pd, metallic Pt and metallic Pd;

and wherein step (c*) is carried out with the material obtained in step (d2).

26. A process in accordance with claim 10, wherein impregnating step (a) is carried out for about 1–500 minutes, the impregnating solution of step (a) comprises about 1–200 g $NH_4SCN$ per liter, and the weight ratio of the support material to said impregnating solution is in the range of from about 1:20 to about 5:1.

27. A process in accordance with claim 10, wherein said reaction conditions comprise a reaction temperature in the range of from about 0°C. to 400°C. a reaction pressure in the range of from about 1 to about 2000 psia, and a volume ratio of CO to $O_2$ in the range of from about 1:100 to about 100:1.

28. A process in accordance with claim 14, wherein said reaction conditions comprise a reaction temperature in the range of from about 0° C. to about 400°C., a reaction pressure in the range of from about 1 to about 2,000 psia, and a volume ratio of CO to $O_2$ in the range of from about 1:100 to about 100:1.

29. A process for oxidizing carbon monoxide comprising the step of contacting a gas mixture comprising CO and $O_2$ with a catalyst composition consisting essentially of alumina that has been treated with ammonium thiocyanate, iron oxide and at least one noble metal selected from the group consisting of platinum and palladium, under such reaction conditions as to at least partially convert said CO and $O_2$ to $CO_2$;

wherein said catalyst composition has been prepared by a preparation process comprising the steps of (a) impregnating a support material comprising alumina with a solution comprising water and dissolved ammonium thiocyanate;
(b) heating the material obtained in step (a) under such conditions as to at least partially dry said material obtained in step (a);
(c) contacting the substantially dried material obtained in step (b) with a solution comprising at least one dissolved compound of at least one noble metal selected from the group consisting of platinum and palladium;
(d1) heating the material obtained in step (c) so as to remove substantially all liquids from said material obtained in step (c);
(c*) impregnating the material obtained in step (d1) with a solution comprising at least one iron compound;
(d*) heating the material obtained in step (c*), so as to substantially dry the material obtained in step (c*), to at least partially convert said at least one iron compound to iron oxide, and to at least partially covert said at least one compound of said at least one noble metal to at least one of oxides of Pt, oxides of Pd, metallic Pt and metallic Pd; and
(e) heating the material obtained in step (d*) in a reducing gas atmosphere at a temperature in the range of from about 550° to about 700° C., under such conditions as to activate said material obtained in step (d*) and to form said catalyst composition.

30. A process in accordance with claim 29, wherein said reducing gas atmosphere is a free hydrogen containing gas.

31. A process in accordance with claim 29, wherein said step (e) is carried out in a stream of $H_2$ at a temperature in the range of from about 600° to about 660° C., for a period of time in the range of from about 0.5 to about 20 hours.

32. A process in accordance with claim 29, wherein impregnating step (a) is carried out for about 1-500 minutes, the impregnating solution of step (a) comprises about 1-200 g $NH_4SCN$ per liter, and the weight ratio of the support material to said impregnating solution is in the range of from about 1:20 to about 5:1.

33. A process in accordance with claim 32, said impregnating step (a) is carried out for about 10-100 minutes, said impregnating solution comprises about 10-100 g $NH_4SCN$ per liter, and said weight ratio is in the range of about 1:5 to about 1:1.

34. A process in accordance with claim 29, wherein said catalyst composition comprises from about 0.5 to about 5 weight percent of said noble metal and about 0.2 to about 4 weight percent Fe.

35. A process in accordance with claim 29, wherein said noble metal is platinum.

36. A process in accordance with claim 29, wherein the temperature in step (d1) is in the range of from about 30° to about 200° C., and heating step (b) is carried out at a temperature in the range of from about 40° to about 200° C.

37. A process in accordance with claim 29, wherein said reaction conditions comprise a reaction temperature in the range of from about 0° C. to about 400° C., a reaction pressure in the range of from about 1 to abut 2,000 psia, and a volume ratio of CO to $O_2$ in the range of from about 1:100 to about 100:1.

38. A process in accordance with claim 29, wherein said process is carried out in the cavity of a $CO_2$ laser, so as to recombine CO and $O_2$ formed by dissociation of $CO_2$.

* * * * *

UNITED STATES PATENT AND TRADEMARK OFFICE
CERTIFICATE OF CORRECTION

PATENT NO. : 4,808,394
DATED : February 28, 1989
INVENTOR(S) : John H. Kolts, Simon G. Kukes It is certified that error appears in the above-identified patent and that said Letters Patent is hereby corrected as shown below:

Claim 1, column 9, line 34, delete "cover" and insert therefor --- convert ---.

Claim 4, column 9, line 54, delete "1≥200" and insert therefor --- 1-200 ---.

Claim 13, column 10, line 59, delete "12" and insert therefor --- 14 ---.

Claim 14, column 11, line 26, delete "and".

Signed and Sealed this

Sixteenth Day of January, 1990

*Attest:*

JEFFREY M. SAMUELS

*Attesting Officer*   *Acting Commissioner of Patents and Trademarks*